US012591744B2

(12) United States Patent
Zhang et al.

(10) Patent No.: US 12,591,744 B2
(45) Date of Patent: Mar. 31, 2026

(54) METHOD FOR TRAINING SEMANTIC REPRESENTATION MODEL, DEVICE AND STORAGE MEDIUM

(71) Applicant: BEIJING BAIDU NETCOM SCIENCE TECHNOLOGY CO., LTD., Beijing (CN)

(72) Inventors: Shuai Zhang, Beijing (CN); Lijie Wang, Beijing (CN); Xinyan Xiao, Beijing (CN); Yue Chang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 550 days.

(21) Appl. No.: 17/655,770

(22) Filed: Mar. 21, 2022

(65) Prior Publication Data

US 2023/0004721 A1 Jan. 5, 2023

(30) Foreign Application Priority Data

Jun. 30, 2021 (CN) .......................... 202110738680.7

(51) Int. Cl.
    *G06F 40/30* (2020.01)
    *G06F 40/211* (2020.01)
    *G06F 40/284* (2020.01)
(52) U.S. Cl.
    CPC ............ *G06F 40/30* (2020.01); *G06F 40/211* (2020.01); *G06F 40/284* (2020.01)
(58) Field of Classification Search
    CPC ....... G06F 40/30; G06F 40/211; G06F 40/284
    See application file for complete search history.

(56) References Cited

U.S. PATENT DOCUMENTS 9,846,692 B2 * 12/2017 Starostin ............... G06F 16/367
10,528,661 B2 * 1/2020 Feldman ................. G06F 40/30
(Continued)

FOREIGN PATENT DOCUMENTS

| CN | 105989027 A | * | 10/2016 |
| CN | 108830385 A | | 11/2018 |

(Continued)

OTHER PUBLICATIONS

Jiang, Jing, and ChengXiang Zhai. "A systematic exploration of the feature space for relation extraction." Human Language Technologies 2007: The Conference of the North American Chapter of the Association for Computational Linguistics; Proceedings of the Main Conference. 2007. (Year: 2007).*
(Continued)

*Primary Examiner* — Andrew C Flanders
*Assistant Examiner* — Theodore Withey
(74) *Attorney, Agent, or Firm* — Kwan & Olynick LLP

(57) ABSTRACT

Disclosed are a method for training a semantic representation model, a device and a storage medium, which relate to the field of computer technologies, and particularly to the field of artificial intelligence, such as a natural language processing technology, a deep learning technology, or the like. The method for training a semantic representation model includes: obtaining an anchor sample based on a sentence, and obtaining a positive sample and a negative sample based on syntactic information of the sentence; processing the anchor sample, the positive sample and the negative sample using the semantic representation model respectively, so as to obtain an anchor-sample semantic representation, a positive-sample semantic representation and a negative-sample semantic representation; constructing a contrast loss function based on the anchor-sample semantic representation, the positive-sample semantic representation and a negative-sample semantic representation- (Continued)

Obtaining an anchor sample based on a sentence, and obtaining a positive sample and a negative sample based on syntactic information of the sentence ⌐101

Processing the anchor sample, the positive sample and the negative sample using the semantic representation model respectively, so as to obtain an anchor-sample semantic representation, a positive-sample semantic representation and a negative-sample semantic representation ⌐102

Constructing a contrast loss function based on the anchor-sample semantic representation, the positive-sample semantic representation, and the negative-sample semantic representation ⌐103

Training the semantic representation model based on the contrast loss function ⌐104 tion, and the negative-sample semantic representation; and training the semantic representation model based on the contrast loss function.

6 Claims, 3 Drawing Sheets

(56) References Cited

U.S. PATENT DOCUMENTS

| | | | |
|---|---|---|---|
| 2006/0095248 A1* | 5/2006 | Menezes | G06F 40/44 704/3 |
| 2013/0297216 A1* | 11/2013 | Hirst | G16Z 99/00 702/19 |
| 2015/0006533 A1* | 1/2015 | Shinzato | G06F 16/35 707/737 |
| 2016/0124936 A1* | 5/2016 | Wang | G06F 8/427 704/9 |
| 2017/0235719 A1* | 8/2017 | Feldman | G06F 40/216 704/9 |
| 2018/0365593 A1* | 12/2018 | Galitsky | G06F 16/36 |
| 2019/0325023 A1* | 10/2019 | Awadallah | G06N 3/08 |
| 2019/0347077 A1* | 11/2019 | Huebra | G06F 16/22 |
| 2020/0097742 A1 | 3/2020 | Kumar et al. | |
| 2020/0327284 A1* | 10/2020 | Sapugay | G06N 3/006 |
| 2020/0380298 A1 | 12/2020 | Aggarwal et al. | |
| 2021/0182662 A1 | 6/2021 | Lai et al. | |
| 2022/0050967 A1* | 2/2022 | Veyseh | G06F 40/289 |

FOREIGN PATENT DOCUMENTS

| | | | | | |
|---|---|---|---|---|---|
| CN | 109918663 A | 6/2019 | | | |
| CN | 111143530 A | 5/2020 | | | |
| CN | 111325223 A | 6/2020 | | | |
| CN | 111832312 A | 10/2020 | | | |
| CN | 112560496 A | 3/2021 | | | |
| CN | 112733550 A | 4/2021 | | | |
| CN | 112966102 A | * | 6/2021 | ............ | G06F 40/30 |
| CN | 113033194 A | 6/2021 | | | |
| JP | 2006031198 A | 2/2006 | | | |
| JP | 2017049681 A | 3/2017 | | | |
| JP | 2019509551 A | 4/2019 | | | |
| JP | 2020181486 A | 11/2020 | | | |
| WO | WO-2011065617 A1 | * | 6/2011 | ............ | G06F 40/30 |
| WO | 2020218314 A1 | 10/2020 | | | |

OTHER PUBLICATIONS

Galitsky, Boris A., Josep Lluis De La Rosa, and Gábor Dobrocsi. "Inferring the semantic properties of sentences by mining syntactic parse trees." Data & Knowledge Engineering 81 (2012): 21-45. (Year: 2012).*

Basak, Rohini, et al. "Recognizing textual entailment by soft dependency tree matching." Computación y Sistemas 19.4 (2015): 685-700. (Year: 2015).*

First office action for JP2022-031735, issued on May 9, 2023, 2 pgs.

CN Office Action for Application No. 202110738680.7, dated Nov. 22, 2021, 6 pages.

* cited by examiner

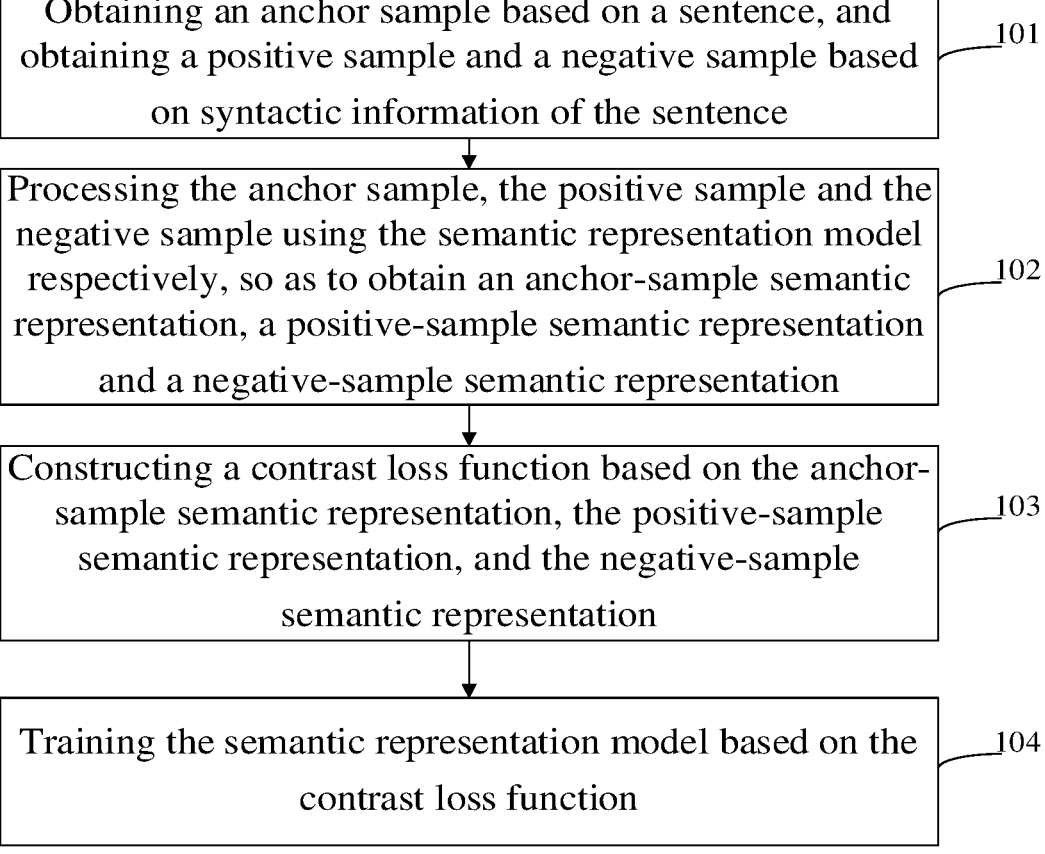

Obtaining an anchor sample based on a sentence, and obtaining a positive sample and a negative sample based on syntactic information of the sentence ⟋101

Processing the anchor sample, the positive sample and the negative sample using the semantic representation model respectively, so as to obtain an anchor-sample semantic representation, a positive-sample semantic representation and a negative-sample semantic representation ⟋102

Constructing a contrast loss function based on the anchor-sample semantic representation, the positive-sample semantic representation, and the negative-sample semantic representation ⟋103

Training the semantic representation model based on the contrast loss function ⟋104

Fig. 1

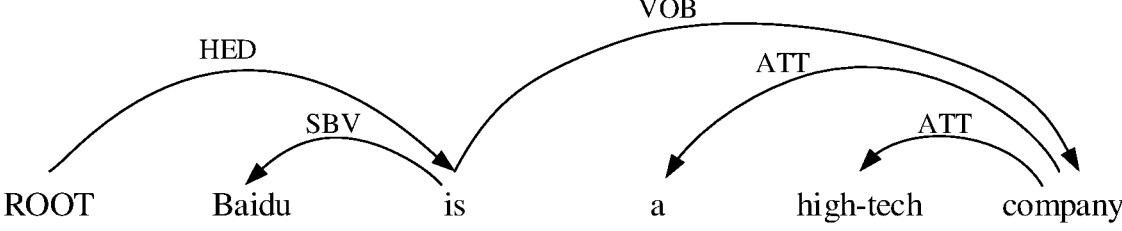

METHOD FOR TRAINING SEMANTIC REPRESENTATION MODEL, DEVICE AND STORAGE MEDIUM

The present disclosure claims the priority and benefit of Chinese Patent Application No. 202110738680.7, filed on Jun. 30, 2021, entitled "METHOD AND APPARATUS FOR TRAINING SEMANTIC REPRESENTATION MODEL, DEVICE AND STORAGE MEDIUM". The disclosure of the above application is incorporated herein by reference in its entirety.

TECHNICAL FIELD

The present disclosure relates to the field of computer technologies, particularly to the field of artificial intelligence, such as a natural language processing technology, a deep learning technology, or the like, and more particularly to a method for training a semantic representation model, a device and a storage medium.

BACKGROUND

In a natural language processing operation, a semantic representation model may be used to convert a sentence into a corresponding semantic representation for a subsequent processing operation. A difference in a syntactic structure of the sentence may cause a great difference in semantics.

In a related art, a structure of the semantic representation model may be modified to introduce syntactic information, so as to train the semantic representation model.

SUMMARY

The present disclosure provides a method for training a semantic representation model, a device and a storage medium.

According to an aspect of the present disclosure, there is provided a method for training a semantic representation model, including: obtaining an anchor sample based on a sentence, and obtaining a positive sample and a negative sample based on syntactic information of the sentence; processing the anchor sample, the positive sample and the negative sample using the semantic representation model respectively, so as to obtain an anchor-sample semantic representation, a positive-sample semantic representation and a negative-sample semantic representation; constructing a contrast loss function based on the anchor-sample semantic representation, the positive-sample semantic representation, and the negative-sample semantic representation; and training the semantic representation model based on the contrast loss function.

According to another aspect of the present disclosure, there is provided an electronic device, including: at least one processor; and a memory connected with the at least one processor communicatively, wherein the memory stores instructions executable by the at least one processor to enable the at least one processor to perform the method according to any one of the above-mentioned aspects.

According to another aspect of the present disclosure, there is provided a non-transitory computer readable storage medium with computer instructions stored thereon, wherein the computer instructions are used for causing a computer to perform the method according to any one of the above-mentioned aspects.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings, FIG. 1 is a schematic diagram according to a first embodiment of the present disclosure;

FIG. 2 is a schematic diagram according to a second embodiment of the present disclosure;

DETAILED DESCRIPTION OF EMBODIMENTS

Figure 3:
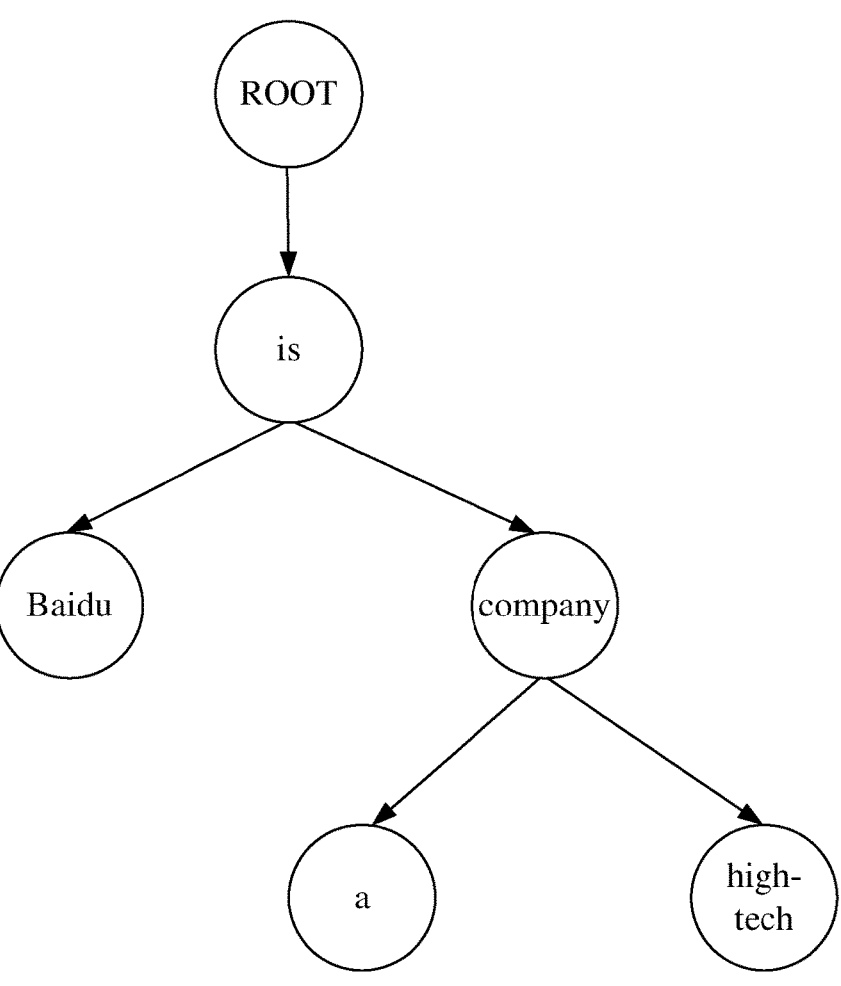
FIG. 3 is a schematic diagram according to a third embodiment of the present disclosure.

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Different syntactic information of a sentence may correspond to different semantics. For example, although sentences "Q1: does a grandson have an inheritance right after his grandma passes away?" and "Q2: does a grandma have an inheritance right after her grandson passes away?" are literally similar, expressed semantics is completely different.

In a related art, a semantic representation may contain syntactic information by modifying a structure of a semantic representation model, but this model structure modification method is not beneficial to use of a downstream task, and also has problems in terms of accuracy.

FIG. 1 is a schematic diagram according to a first embodiment of the present disclosure, and the present embodiment provides a method for training a semantic representation model, including:

101: obtaining an anchor sample based on a sentence, and obtaining a positive sample and a negative sample based on syntactic information of the sentence.

102: processing the anchor sample, the positive sample and the negative sample using the semantic representation model respectively, so as to obtain an anchor-sample semantic representation, a positive-sample semantic representation and a negative-sample semantic representation.

103: constructing a contrast loss function based on the anchor-sample semantic representation, the positive-sample semantic representation, and the negative-sample semantic representation.

104: training the semantic representation model based on the contrast loss function.

Sentences may be first collected as samples in advance, and then, the semantic representation model is trained based on the sentences.

After the sentence is obtained, dependency parsing may be performed on the sentence to obtain the syntactic information of the sentence.

Dependency parsing is one of natural-language-processing core technologies, and intended to determine the syntactic information of the sentence by analyzing dependence relationships between tokens in the sentence.

Taking the sentence "Baidu is a high-tech company" as an example, dependency parsing is performed on the sentence, and the obtained syntactic information is shown in FIG. 2. The syntactic information may include the relationships between the tokens in the sentence, different relationships may be annotated with different symbols, and the annotations of the relationships between the tokens in FIG. 2 have the following meanings:

HED: a core relationship which refers to a core of the entire sentence;

SBV: a subject-predicate relationship which refers to a relationship between a subject and a predicate;

VOB: a verb-object relationship which refers to a relationship between an object and a predicate;

ATT: an attribute-head relationship which refers to a relationship between an attribute and a head.

The syntactic information of the sentence may be conveniently and rapidly acquired by performing the dependency parsing on the sentence.

After the syntactic information of the sentence is obtained, a syntactic tree may be constructed based on the syntactic information, and based on the example shown in FIG. 2, the constructed syntactic tree may be shown in FIG. 3.

After the syntactic tree is obtained, a text corresponding to a subtree included in the syntactic tree may be used as the positive sample, and another text may be obtained based on a token in the subtree, contains the token, does not correspond to the subtree in the syntactic tree, and is used as the negative sample. For distinction, the text used as the positive sample may be referred to as a first text, and the text used as the negative sample may be referred to as a second text.

For example, as shown in FIG. 3, three tokens "a", "high-tech" and "company" may form a subtree in the syntactic tree, and then, the text "a high-tech company" corresponding to the subtree may be used as one positive sample.

Accuracy of the positive and negative samples may be improved by obtaining the positive and negative samples based on the subtree of the syntactic tree.

After the subtree corresponding to the positive sample is obtained, the negative sample may be obtained based on the token in the subtree.

In order to improve a training effect on the semantic representation model, in general, the positive and negative samples may contain the same number of tokens. That is, a text in which tokens are consecutive and a number of the tokens is same as a number of the tokens included in the positive sample may be selected as the second text in the sentence based on the token in the subtree.

Taking the subtree formed by the three tokens "a", "high-tech" and "company" as an example, the negative sample may be obtained based on the token "high-tech" in the subtree; for example, the text "is a high-tech" includes three tokens, the three tokens are consecutive, the three tokens include "high-tech", and therefore, the text "is a high-tech" may be used as the negative sample.

Selection of the text having the same number of tokens as the positive sample as the negative sample may improve an effect of the semantic representation model.

Plural negative samples may be selected corresponding to one positive sample. For example, corresponding to the above-mentioned positive example "a high-tech company", "Baidu is a" may be selected as one negative example based on the token "a" therein.

The anchor sample may be the above-mentioned whole sentence, or the tokens in the above-mentioned subtree corresponding to the positive sample and the negative sample; for example, the whole sentence "Baidu is a high-tech company" may be used as the anchor sample, or the above-mentioned "high-tech" may be used as the anchor sample.

Selection of the whole sentence or the tokens corresponding to the positive and negative samples may expand data of the anchor sample, thereby improving the effect of the semantic representation model.

After obtained, the anchor sample, the positive sample, and the negative sample may be input into the semantic representation model to obtain the corresponding semantic representations.

The semantic representation model refers to a model for converting a sentence into a corresponding vector representation, and various related pretrained model structures may be adopted, such as a bidirectional encoder representation from transformers (BERT), a robustly optimized BERT pretraining approach (RoBERTa), an enhanced representation from knowledge integration (ERNIE), or the like.

Figure 4:
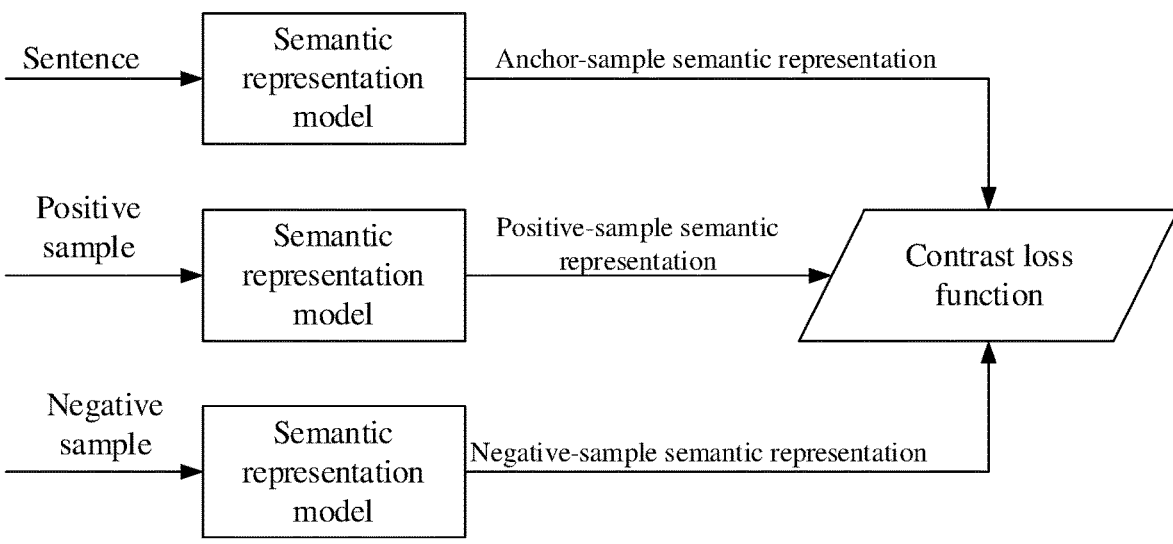
FIG. 4 is a schematic diagram according to a fourth embodiment of the present disclosure.

As shown in FIG. 4, for example, the anchor sample is a sentence; when the sentence is input into the semantic representation model, an output representation may be referred to as the anchor-sample semantic representation; when the positive sample is input into the semantic representation model, an output representation may be referred to as the positive-sample semantic representation; when the negative sample is input into the semantic representation model, an output representation may be referred to as the negative-sample semantic representation.

Then, the contrast loss function may be constructed based on the three semantic representations.

The contrast loss function is a loss function adopted in a contrast learning process, and the contrast learning process is one of self-supervision learning processes and aims to attract a positive sample and repel a negative sample.

One calculation formula for the contrast loss function is denoted as:

$$L = -\log \frac{\exp(sim(f(q, \theta), f(k^+, \theta))/\tau)}{\sum_{i=1}^{K} \exp(sim(f(q, \theta), f(k_i, \theta))/\tau)}$$

where L is the contrast loss function, q is the anchor sample, $k^+$ is the positive sample, $k_i$ is the ith negative sample, the total number of the negative samples is K, $\theta$ is a parameter of the semantic representation model, $f(*, \theta)$ is the corresponding semantic representation obtained after * is processed by the semantic representation model, $\tau$ is a hyperparameter, and sim( )represents a calculation of a similarity among vectors.

After the contrast loss function is obtained, the semantic representation model may be trained using the contrast loss function; that is, the parameter of the semantic representation model is adjusted based on the contrast loss function until a preset ending condition is reached, the ending condition being, for example, convergence of the contrast loss function or achievement of a preset number of iterations; the model parameter obtained when the preset ending condition is reached is used as a final model parameter, and the corresponding semantic representation model is used as a final semantic representation model, such that the final semantic representation model may be applied to process the sentence to obtain a semantic representation corresponding to the sentence including the syntactic information.

In the present embodiment, the positive sample and the negative sample are obtained based on the syntactic information of the sentence, and the semantic representation model is trained based on the anchor sample, the positive sample, and the negative sample, such that the semantic representation of the sentence may include the syntactic information without modifying the structure of the model.

Further, the method according to the present embodiment may be applied to a pretraining process; that is, in the pretraining process of the semantic representation model, the above-mentioned contrast loss function is adopted for training without changing the structure of the pretrained model, such that when the pretrained model is applied to a downstream task, the downstream task is unaware of the process. In addition, when the pretrained model is applied to a fine tuning operation in the downstream task, the syntactic information is not required to be introduced, and therefore, a performance of the downstream task is not influenced. In the present embodiment, the syntactic information may be implicitly included in the semantic representation, and compared with a method in which the syntactic information is used explicitly (for example, addition of a pretraining task for predicting a parent node of each token), the method according to the present embodiment may avoid syntactic error accumulation and improve accuracy of the semantic representation model.

Figure 5:
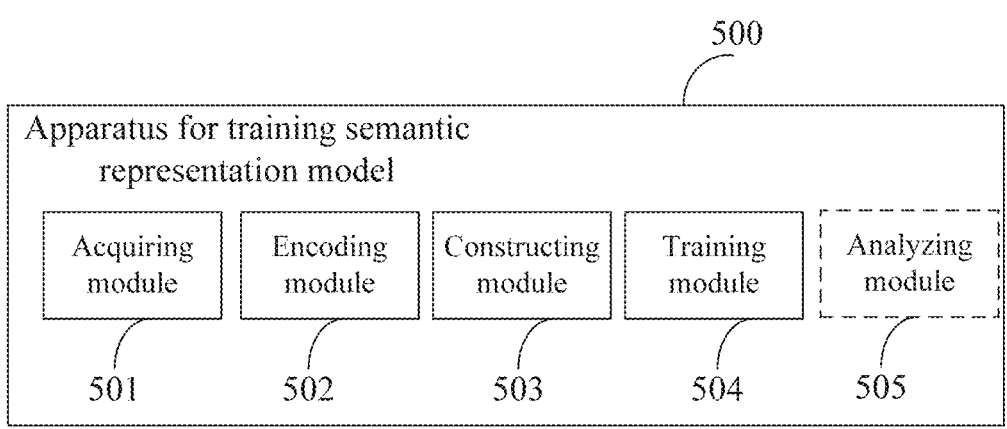
FIG. 5 is a schematic diagram according to a fifth embodiment of the present disclosure.

FIG. 5 is a schematic diagram according to a fifth embodiment of the present disclosure, and the present embodiment provides an apparatus for training a semantic representation model. As shown in FIG. 5, the apparatus 500 includes: an acquiring module 501, an encoding module 502, a constructing module 503, and a training module 504.

The acquiring module 501 is configured to obtain an anchor sample based on a sentence, and obtain a positive sample and a negative sample based on syntactic information of the sentence; the encoding module 502 is configured to process the anchor sample, the positive sample and the negative sample using the semantic representation model respectively, so as to obtain an anchor-sample semantic representation, a positive-sample semantic representation and a negative-sample semantic representation; the constructing module 503 is configured to construct a contrast loss function based on the anchor-sample semantic representation, the positive-sample semantic representation, and the negative-sample semantic representation; and the training module 504 is configured to train the semantic representation model based on the contrast loss function.

In some embodiments, the apparatus 500 further includes: an analyzing module 505 configured to perform dependency parsing on the sentence to obtain the syntactic information of the sentence.

In some embodiments, the acquiring module 501 is specifically configured to: construct a syntactic tree based on the syntactic information of the sentence; acquire a first text corresponding to a subtree contained in the syntactic tree, and take the first text as the positive sample; and based on a token in the subtree, acquire a second text containing the token and different from the text corresponding to the subtree, and take the second text as the negative sample.

In some embodiments, the acquiring module 501 is further specifically configured to: based on the token in the subtree, select, as the second text in the sentence, a text in which tokens are consecutive and a number of the tokens is same as a number of the tokens included in the positive sample.

In some embodiments, the acquiring module 501 is specifically configured to: take the sentence as the anchor sample; or, take, as the anchor sample, the token in the subtree contained in the syntactic tree corresponding to the sentence.

In the present embodiment, the positive sample and the negative sample are obtained based on the syntactic information of the sentence, and the semantic representation model is trained based on the anchor sample, the positive sample, and the negative sample, such that the semantic representation of the sentence may include the syntactic information without modifying the structure of the model.

It may be understood that in the embodiments of the present disclosure, mutual reference may be made to the same or similar contents in different embodiments.

It may be understood that "first", "second", or the like, in the embodiments of the present disclosure are only for distinguishing and do not represent an importance degree, a sequential order, or the like.

According to the embodiment of the present disclosure, there are also provided an electronic device, a readable storage medium and a computer program product.

Figure 6:
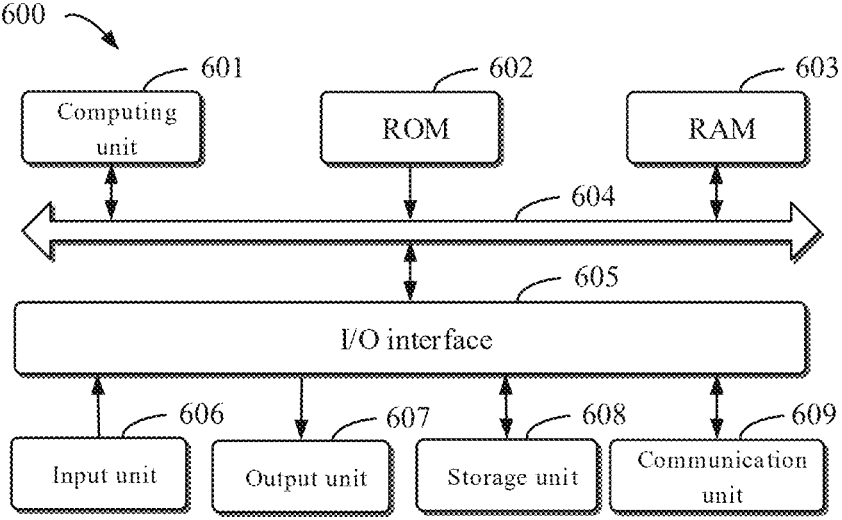
FIG. 6 is a schematic diagram of an electronic device configured to implement any of methods for training a semantic representation model according to the embodiments of the present disclosure.

FIG. 6 shows a schematic block diagram of an exemplary electronic device 600 which may be configured to implement the embodiments of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the electronic device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the electronic device 600 may be also stored in the RAM 603. The computing unit 601, the ROM 602, and the RAM 603 are connected with one other through a bus 604. An input/output (I/O) interface 605 is also connected to the bus 604.

The plural components in the electronic device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the electronic device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method for training a semantic representation model. For example, in some embodiments, the method for training a semantic representation model may be implemented as a computer software program tangibly contained in a machine readable medium, such as the storage unit 608. In some embodiments, part or all of the computer program may be loaded and/or installed into the electronic device 600 via the ROM 602 and/or the communication unit 609. When the computer program is loaded into the RAM 603 and executed by the computing unit 601, one or more steps of the method for training a semantic representation model described above may be performed. Alternatively, in other embodiments, the computing unit 601 may be configured to perform the method for training a semantic representation model by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A computer-implemented method for training a semantic representation model, comprising:

obtaining an anchor sample which is a sentence including multiple tokens;

obtaining a positive sample and a negative sample based on syntactic information of the sentence, comprising:

constructing a syntactic tree with the multiple tokens each forming a node of the syntactic tree based on the syntactic information of the sentence;

acquiring a first text including a first number of consecutive tokens forming a subtree in the syntactic tree, and taking the first text as the positive sample; and acquiring a second text including a second number of consecutive tokens including at least a token in the subtree and a token outside the subtree, and taking the second text as the negative sample, wherein the second number is equal to the first number;

inputting the anchor sample, the positive sample and the negative sample into the semantic representation model, respectively, and outputting by the semantic representation model an anchor-sample semantic representation, a positive-sample semantic representation and a negative-sample semantic representation, respectively;

constructing a contrast loss function based on the anchor-sample semantic representation, the positive-sample semantic representation, and the negative-sample semantic representation; and training the semantic representation model based on the contrast loss function, so that the trained semantic representation model has a capability of outputting a semantic representation of an inputted sentence including implicitly syntactic information of the inputted sentence.

2. The method according to claim 1, further comprising:

performing dependency parsing on the sentence to obtain the syntactic information of the sentence.

3. An electronic device, comprising:

at least one processor; and a memory connected with the at least one processor communicatively;

wherein the memory stores instructions executable by the at least one processor to cause the at least one processor to perform a method for training a semantic representation model, which comprises:

obtaining an anchor sample which is a sentence including multiple tokens;

obtaining a positive sample and a negative sample based on syntactic information of the sentence, comprising:

constructing a syntactic tree with the multiple tokens each forming a node of the syntactic tree based on the syntactic information of the sentence;

acquiring a first text including a first number of consecutive tokens forming a subtree in the syntactic tree, and taking the first text as the positive sample; and acquiring a second text including a second number of consecutive tokens including at least a token in the subtree and a token outside the subtree, and taking the second text as the negative sample, wherein the second number is equal to the first number;

inputting the anchor sample, the positive sample and the negative sample into the semantic representation model, respectively, and outputting by the semantic representation model an anchor-sample semantic representation, a positive-sample semantic representation and a negative-sample semantic representation, respectively;

constructing a contrast loss function based on the anchor-sample semantic representation, the positive-sample semantic representation, and the negative-sample semantic representation; and training the semantic representation model based on the contrast loss function, so that the trained semantic representation model has a capability of outputting a semantic representation of an inputted sentence including implicitly syntactic information of the inputted sentence.

4. The electronic device according to claim 3, wherein the method further comprises:

performing dependency parsing on the sentence to obtain the syntactic information of the sentence.

5. A non-transitory computer readable storage medium storing computer instructions for causing a computer to perform a method for training a semantic representation model, which comprises:

obtaining an anchor sample which is a sentence including multiple tokens;

obtaining a positive sample and a negative sample based on syntactic information of the sentence, comprising:

constructing a syntactic tree with the multiple tokens each forming a node of the syntactic tree based on the syntactic information of the sentence;

acquiring a first text including a first number of consecutive from tokens forming a subtree in the syntactic tree, and taking the first text as the positive sample; and acquiring a second text including a second number of consecutive tokens including at least a token in the subtree and a token outside the subtree, and taking the second text as the negative sample, wherein the second number is equal to the first number;

inputting the anchor sample, the positive sample and the negative sample into the semantic representation model, respectively, and outputting by the semantic representation model an anchor-sample semantic representation, a positive-sample semantic representation and a negative-sample semantic representation, respectively;

constructing a contrast loss function based on the anchor-sample semantic representation, the positive-sample semantic representation, and the negative-sample semantic representation; and training the semantic representation model based on the contrast loss function, so that the trained semantic representation model has a capability of outputting a semantic representation of an inputted sentence including implicitly syntactic information of the inputted sentence.

6. The non-transitory computer readable storage medium according to claim 5, wherein the method further comprises:

performing dependency parsing on the sentence to obtain the syntactic information of the sentence.

* * * * *